United States Patent [19]

Fukuo et al.

[11] Patent Number: 4,758,206

[45] Date of Patent: Jul. 19, 1988

[54] CAM SHAFT DRIVE STRUCTURE FOR OHC V-TYPE ENGINE

[75] Inventors: Koichi Fukuo; Michio Sato, both of Saitama, Japan

[73] Assignee: Honda Giken Kogyo Kabushiki Kaisha, Tokyo, Japan

[21] Appl. No.: 917,722

[22] Filed: Oct. 10, 1986

[30] Foreign Application Priority Data

Oct. 21, 1985 [JP] Japan .................. 60-235050

[51] Int. Cl.$^4$ .................................. F16H 7/02
[52] U.S. Cl. ...................... 474/86; 474/87
[58] Field of Search ........... 74/15.63; 474/101, 117, 474/84–89

[56] References Cited

U.S. PATENT DOCUMENTS

| | | | |
|---|---|---|---|
| 2,037,436 | 4/1936 | Roddewig et al. | 474/87 X |
| 2,508,756 | 5/1950 | Jackoboice | 474/87 X |
| 2,595,098 | 4/1952 | Poglay | 474/87 X |
| 2,827,804 | 3/1958 | Wolfenden et al. | 474/87 |
| 3,217,552 | 11/1965 | Daub | 474/87 |

FOREIGN PATENT DOCUMENTS 59-179244  11/1984  Japan .
60-70730   5/1985   Japan .

OTHER PUBLICATIONS

Pipes, *Applied Mathematics For Engineers and Physicists*, 2nd Ed., McGraw-Hill 1958.

*Primary Examiner*—Thuy M. Bui
*Attorney, Agent, or Firm*—Lyon & Lyon

[57] ABSTRACT

In the case of a cam shaft drive structure in which a cogged belt is passed around a pair of cam shaft pulleys for two cylinder banks of an OHC V-type engine and a crank shaft pulley, it has been widely believed that the tension of the cogged belt resulting from the longitudinal vibration of the cogged belt can be minimized by reducing the masses of the cam shaft pulleys to a least possible value. However, it was discovered by the inventors that it is not necessarily the case and on the contrary a favorable result can be obtained by selecting the moment of inertia of the cam shaft pulley on the tight side to be greater than the moment of inertia of the cam shaft pulley on the slack side. The reverse surface of the cogged belt can be conveniently utilized for driving accessory equipment and for engaging an idler pulley thereto.

9 Claims, 2 Drawing Sheets

CAM SHAFT DRIVE STRUCTURE FOR OHC V-TYPE ENGINE

TECHNICAL FIELD

This invention relates to a cam shaft drive structure for an OHC (overhead cam shaft) V-type engine using a cogged belt, and in particular to an improved cam shaft drive structure according to which the longitudinal vibration of the cogged belt is effectively controlled.

BACKGROUND OF THE INVENTION

Conventionally, a cam shaft of an OHC engine has typically been driven by a chain, but a cogged belt which is lighter in weight and can provide more quiet operation has lately been preferred over a chain. A cogged belt is typically reinforced by steel wires of high tensile strength and stretches very little for its weight, and its longitudinal vibration is not a problem under a normal circumstance. However, in a V-type engine, since the span lengths of the cogged belt between pulleys tend to be long, the longitudinal vibration of the cogged belt may become excessive when the maximum rotational speed of the engine is to be increased, and the strength of the base ends of the teeth of the cogged belt may become a problem.

The motion of a cam shaft drive system is typically coupled with the motion of the valve drive system and is therefore so complex that it is extremely difficult to predict its behavior. Generally, it has been considered as desirable to reduce the moments of inertia of the pulleys as much as possible to the end of raising the natural frequency of the system. And, hitherto, in designing a cam shaft drive system for a V-type OHC engine, it has been customary to use a pair of cam shaft pulleys of an identical configuration and having the least possible masses. However, according to the analyses conducted by the inventors it was found that such an approach is not necessarily appropriate in the case of a cam drive structure for an OHC V-type engine, and on the contrary a favorable result was obtained by making the moment of inertia of one of the cam shaft pulleys greater than that of the other.

BRIEF SUMMARY OF THE PRESENT INVENTION

In view of such problems of the prior art and the recognitions of the Inventors, a primary object of the present invention is to provide a cam shaft drive structure for OHC V-type engine in which the longitudinal vibration of a cogged belt is effectively controlled.

According to the present invention, such an object is accomplished by providing a cam shaft drive structure in which a cogged belt is passed around a pair of cam shaft pulleys for two cylinder banks of an OHC V-type engine and a crank shaft pulley, characterized in that: the moment of inertia of the cam shaft pulley on the tight side is greater than the moment of inertia of the cam shaft pulley on the slack side.

By setting the moment of inertia of the cam shaft pulley on the slack side to a sufficiently small value and increasing the moment of inertia of the cam shaft pulley on the tight side gradually from the same value as that of the cam shaft pulley on the slack side, it can be seen that the load or the tension applied to the cogged belt initially decreases and then starts increasing when the moment of inertia of the cam shaft pulley on the tight side has exceeded a certain value, or, in other words, that the load applied to the cogged belt has a local minimum with respect to the value of the moment of inertia of the cam shaft pulley on the tight side.

The reverse surface of the cogged belt can be conveniently utilized for driving accessory equipment and for engaging an idler pulley thereto.

DETAILED DESCRIPTION OF THE PREFERRED EMBODIMENT(S)

Now an embodiment of the present invention is described in the following with reference to the appended drawings.

Figure 1:
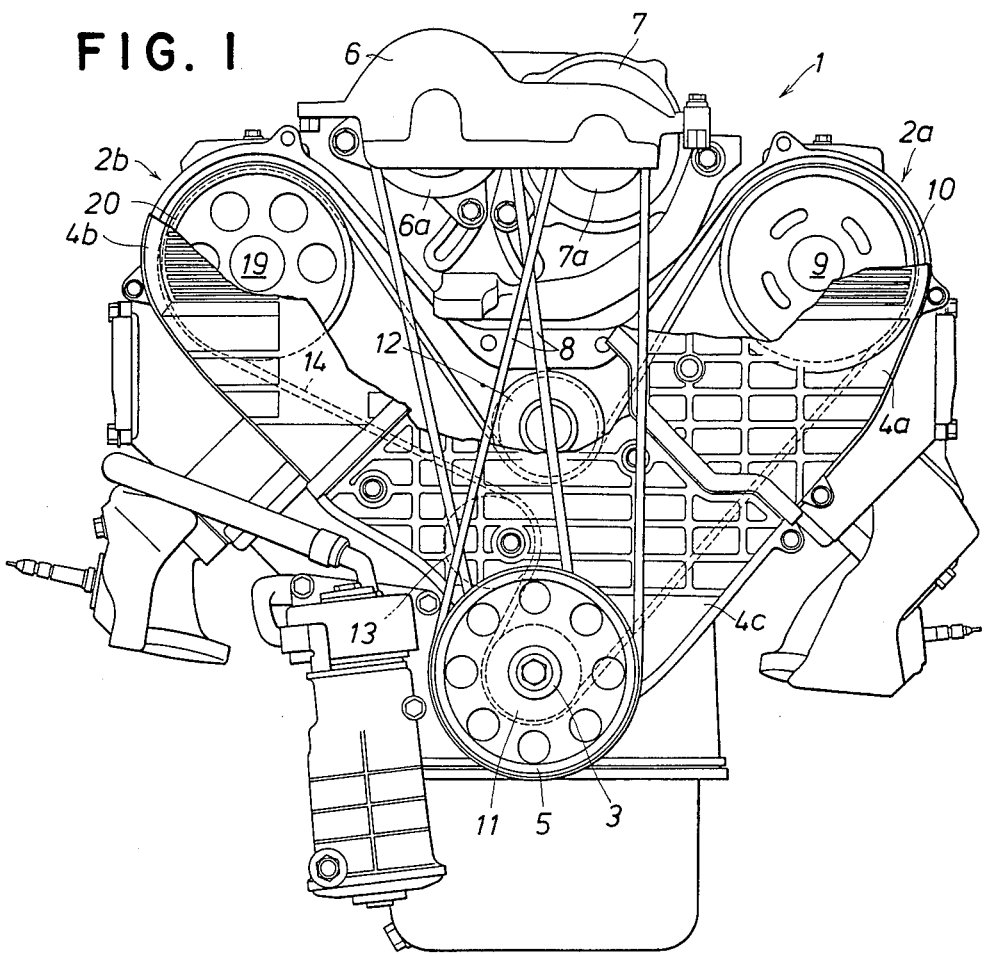
FIG. 1 is a partially broken away front view of an OHC V-type engine having a cam shaft drive structure according to the present invention.

FIG. 1 is a partially broken away front view of a V-type multi cylinder engine according to the present invention. This engine 1 has a pair of banks 2a and 2b of cylinders arranged in the shape of letter V and a crank shaft 3 is disposed along the intersection line of these two cylinder banks 2a and 2b. The axial end of the engine shown in FIG. 1 is covered by threepiece covers 4a to 4c, and a crank shaft pulley 5 is attached to the free end of the crank shaft 3 protruding from one of the covers 4c. This pulley 5 is provided with at least a pair of pulley grooves, and V-belts 8 fitted into these grooves and passed around the pulleys 6a and 7a, respectively, drive the pulleys 6a and 7a of a hydraulic pump 6 and an AC generator 7 arranged on the top surface of the part of the cylinder block located between the two cylinder banks 2a and 2b.

Pulleys 10, 20 and 11, located inside the covers 4a, 4b and 4c, are mounted on the external ends of a pair of cam shafts 9 and 19 and the outer circumference of the crank shaft 3, respectively. A cogged belt 14 is passed around the three pulleys 10, 20 and 11 and the reverse surface of the cogged belt 14 located between the pulleys 10 and 20 of the cam shafts 9 and 19 engages a pulley 12 of a cooling water pump while the reverse surface of the cogged belt 14 between the pulley 20 of the cam shaft 19 of one of the cylinder banks 2b and the pulley 11 of the crank shaft 3 engages an idler pulley 13 for applying tension to the cogged belt 14.

Figure 2:
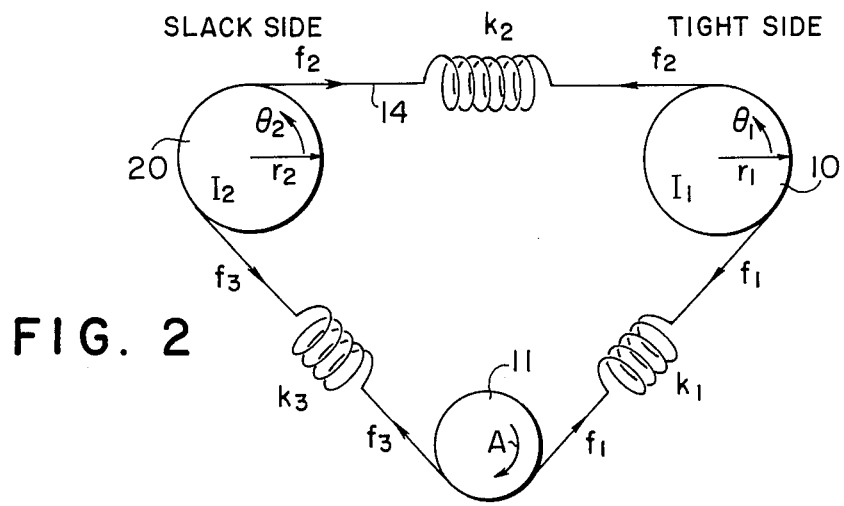
FIG. 2 is a oscillation model of the cam shaft drive structure of FIG. 1.

FIG. 2 shows a vibration model of the cam shaft drive structure of the embodiment shown in FIG. 1. Here, it is assumed that the crank shaft pulley 11 rotates in clockwise direction in the sense of FIG. 2 as indicated by an arrow A, the moments of inertia of the pulleys 10 and 20 on the tight side and the slack side are $I_1$ and $I_2$, respectively, the spring constants of the spans of the cogged belt 14 extending from the pulley 11 of the crank shaft 3, the pulley 10 of the cam shaft 9 on the tight side and the pulley 20 of the cam shaft 19 on the slack side are $k_1$, $k_2$ and $k_3$, respectively, the radii of the pulleys 10 and 20 of the cam shafts 9 and 19 are $r_1$ and $r_2$, respectively, and the angular displacements of the pulleys 10 and 20 of the two cam shafts 9 and 19 are $\theta_1$ and $\theta_2$, respectively. Then, the motions of the pulleys 10 and 20 of the two cam shafts 9 and 19 can be expressed by the following equations.

$$I_1 \theta_1 = -k_1 r_1^2 \theta_1 + k_2 r_1 (-r_1 \theta_1 + r_2 \theta_2) + A_1 \sin \omega t \quad (1)$$

$$I_2 \theta_2 = -k_3 r_2^2 \theta_1 + k_2 r_2 (-r_2 \theta_2 + r_1 \theta_1) + A_2 \sin (\omega t + \tfrac{2}{3} \cdot \pi)$$

The pulley 12 of the cooling water pump and the idler pulley 13 are in contact with the reverse surface of the cogged belt 14, which is devoid of the cogs as opposed to the cogged surface of the cogged belt 14, and the contributions of the pulleys 12 and 13 can be practically neglected when analyzing the longitudinal vibration of the cogged belt 14. The terms $A_1 \sin \omega t$ and $A_2 \sin(\omega t + 2\pi/3)$ represent the external force applied from the valve drive system to the cam shaft pulleys 10 and 20.

By numerically solving Equation (1) and substituting the solutions to the following formulae:

$$f_1 = k_1 r_1 \theta_1$$

$$f_2 = k_2(-r_1\theta_1 + r_2\theta_2)$$

$$f_3 = -k_3 r_2 \theta_2 \quad (2)$$

one can obtain the tensions $f_1$, $f_2$ and $f_3$ of the cogged belt 14 in the various spans thereof. Therefrom, one can obtain the load (tension) $F_T$ of the timing belt 14 at the crank shaft pulley 11 by the following formula.

$$F_T = f_1 - f_3 \quad (3)$$

Figure 3:
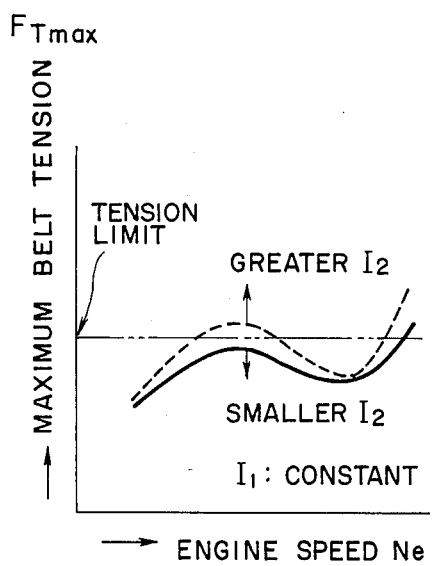
FIG. 3 is a graph showing the changes of the load $F_T$ of the cogged belt against the changes in the moment of inertia $I_2$ of the cam shaft pulley of the slack side and the rotational speed of the engine.
Figure 4:
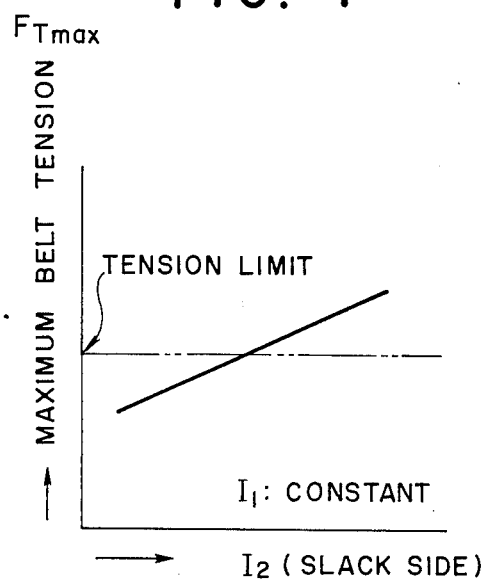
FIG. 4 is a graph showing the changes of the maximum load $F_{Tmax}$ of the cogged belt against the changes in the moment of inertia $I_2$ of the cam shaft pulley of the slack side.

According to a numerical analysis conducted by the inventors, it was found that as the moment of inertia $I_2$ of the cam shaft pulley 20 on the slack side is gradually increased from a possible minimum value while the moment of inertia $I_1$ of the cam shaft pulley 10 on the tight side is fixed the amplitude of the load $F_T$ applied to the cogged belt 14 increases irrespective of whether the rotational speed Ne of the engine is in a high range or in a low range as shown in FIG. 3. In this graph, "tension limit" means an upper limit of the range of the maximum belt tension which is considered to be permissible. As a matter of fact, by plotting the maximum load $F_{Tmax}$ of the cogged belt 14 against the moment of inertia $I_2$ of the cam shaft pulley 19 of the slack side, it can be seen that the moment of inertia $I_2$ should be as small as possible to obtain a favorable result, as shown in FIG. 4.

Figure 5:
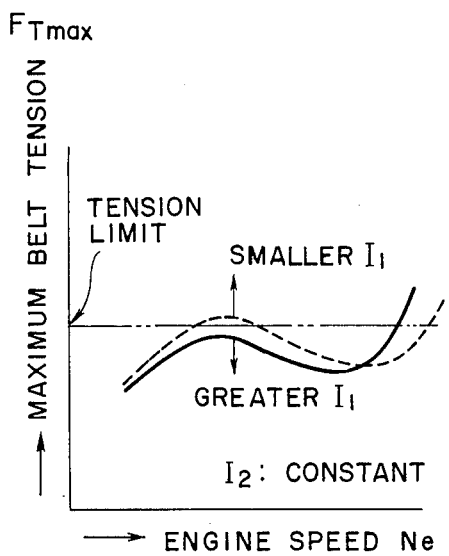
FIG. 5 is a graph showing the changes of the load $F_T$ of the cogged belt against the changes in the moment of inertia $I_1$ of the cam shaft pulley of the tight side and the rotational speed of the engine.
Figure 6:
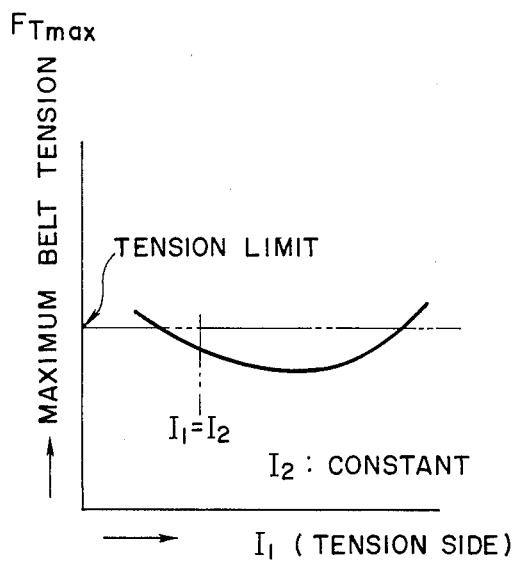
FIG. 6 is a graph showing the changes of the maximum load $F_{Tmax}$ of the cogged belt against the changes in the moment of inertia $I_1$ of the cam shaft pulley of the tight side.

It was also found that if the moment of inertia $I_1$ of the cam shaft pulley 10 of the tight side is gradually increased from a possible minimum value while the moment of inertia $I_2$ of the cam shaft pulley 20 of the slack side is fixed the amplitude of the load $F_T$ applied to the cogged belt 14 increases in high speed range but decreases in low speed range as shown in FIG. 5. As a matter of fact, by plotting the maximum load $F_{Tmax}$ of the cogged belt 14 against the moment of inertia $I_1$ of the cam shaft pulley 10 of the tight side, it can be seen that the maximum load $F_{Tmax}$ of the cogged belt 14 can be minimized by setting the moment of inertia $I_1$ of the cam shaft pulley 10 of the tight side slightly greater than the moment of inertia $I_2$ of the cam shaft pulley 20 of the slack side as shown in FIG. 6.

Thus, according to the present invention, the longitudinal oscillation of the cogged belt can be effectively controlled and the durability of the cogged belt can be improved substantially.

What we claim is:

1. A cam shaft drive structure in which a cogged belt is passed around a tight side cam shaft pulley and a slack side cam shaft pulley for two cylinder banks of an OHC V-type engine and a crank shaft pulley, wherein:
   the tight side cam shaft pulley has a moment of inertia greater than the moment of inertia of the slack side cam shaft pulley.

2. A cam shaft drive structure as defined in claim 1, wherein a pulley is engaged to a reverse surface of a span of the cogged belt located between said cam shaft pulleys.

3. A cam shaft drive structure as defined in claim 1, wherein a pulley is engaged to a reverse surface of a span of the cogged belt located between one of the cam shaft pulleys and the crank shaft pulley.

4. A cam shaft drive structure for an OCH V-type engine comprising:
   a crank shaft pulley;
   two cylinder banks, each having a cam shaft;
   a tight side cam shaft pulley on one cam shaft;
   a slack side cam shaft pulley on the other cam shaft; and
   a cogged belt passing around said crank shaft pulley and said cam shaft pulleys,
   wherein said tight side cam shaft pulley has a moment of inertia greater than that of said slack side cam shaft pulley.

5. A cam shaft structure as defined in claim 4 wherein a pulley is engaged to a reverse surface of a span of said cogged belt located between said cam shaft pulleys.

6. A cam shaft structure as defined in claim 4 wherein a pulley is engaged to a reverse surface of a span of said cogged belt located between one of said cam shaft pulleys and said crank shaft pulley.

7. A method for controlling vibration on OCH V-type engine having a tight side cam shaft pulley and a slack side cam shaft pulley comprising the steps of:
   minimizing the moment of inertia of the slack side cam shaft pulley and
   selecting the tight side cam shaft pulley to have a moment of inertia greater than that of the slack side cam shat pulley.

8. A method for controlling vibration on OCH V-type engine having a tight side cam shaft pulley and a slack side cam shaft pulley comprising the steps of:
   selecting the tight side cam shaft pulley to have a moment of inertia greater than that of the slack side cam shaft pulley.

9. The method of claim 8 further comprising the step of:
   passing a cogged belt around the tight side cam shaft pulley and the slack side cam shaft pulley.

* * * * *